United States Patent

Okada et al.

[11] Patent Number: 5,146,330
[45] Date of Patent: Sep. 8, 1992

[54] APPARATUS AND METHOD FOR REDUCING NOISE IN A VIDEO SIGNAL

[75] Inventors: Takashi Okada; Masumi Ogawa, both of Kanagawa; Mitsuyasu Asano, Tokyo; Masaru Nonogaki, Kanagawa, all of Japan

[73] Assignee: Sony Corporation, Tokyo, Japan

[21] Appl. No.: 713,641

[22] Filed: Jun. 10, 1991

Related U.S. Application Data

[63] Continuation of Ser. No. 294,662, filed as PCT/JP88/00287, Mar. 18, 1988, abandoned.

[30] Foreign Application Priority Data

Mar. 19, 1987 [JP] Japan .................. 62-65066

[51] Int. Cl.$^5$ .................. H04N 5/21; H04N 5/52
[52] U.S. Cl. .................. 358/167; 358/174
[58] Field of Search .................. 358/167, 36, 166, 105, 358/174

[56] References Cited

U.S. PATENT DOCUMENTS

| | | | |
|---|---|---|---|
| 4,539,594 | 9/1985 | Illetschko | 358/167 |
| 4,630,117 | 12/1986 | Parker | 358/174 |
| 4,652,907 | 3/1987 | Fling | 358/36 |
| 4,737,850 | 4/1988 | Lu | 358/167 |
| 4,860,104 | 8/1989 | Katsuyama | 358/167 |

FOREIGN PATENT DOCUMENTS 102972 8/1980 Japan .

Primary Examiner—T. Chin
Attorney, Agent, or Firm—Philip M. Shaw, Jr.

[57] ABSTRACT

A noise reduction circuit (13) in which a difference signal ($S_I-S_{I1}$) between the original video signal ($S_I$) and a delayed video signal ($S_{I1}$) obtained by passing the original video signal ($S_I$) through a delay circuit (5) is obtained, and a signal obtained by passing the above difference signal ($S_I-S_{I1}$) through a gain control amplifier (8) is subtracted from the above original video signal ($S_I$), and the gain which reflects movement in the gain control amplifier (8) is controlled by a movement detection signal ($S_M$) of the above original video signal ($S_z$) and a detection signal ($S_c$) which reflects the input electric field strength so as not to decrease the gain of the gain control amplifier (8) at middle to weak electric field, the noise reduction circuit may be applied to a television receiver, etc.

16 Claims, 8 Drawing Sheets

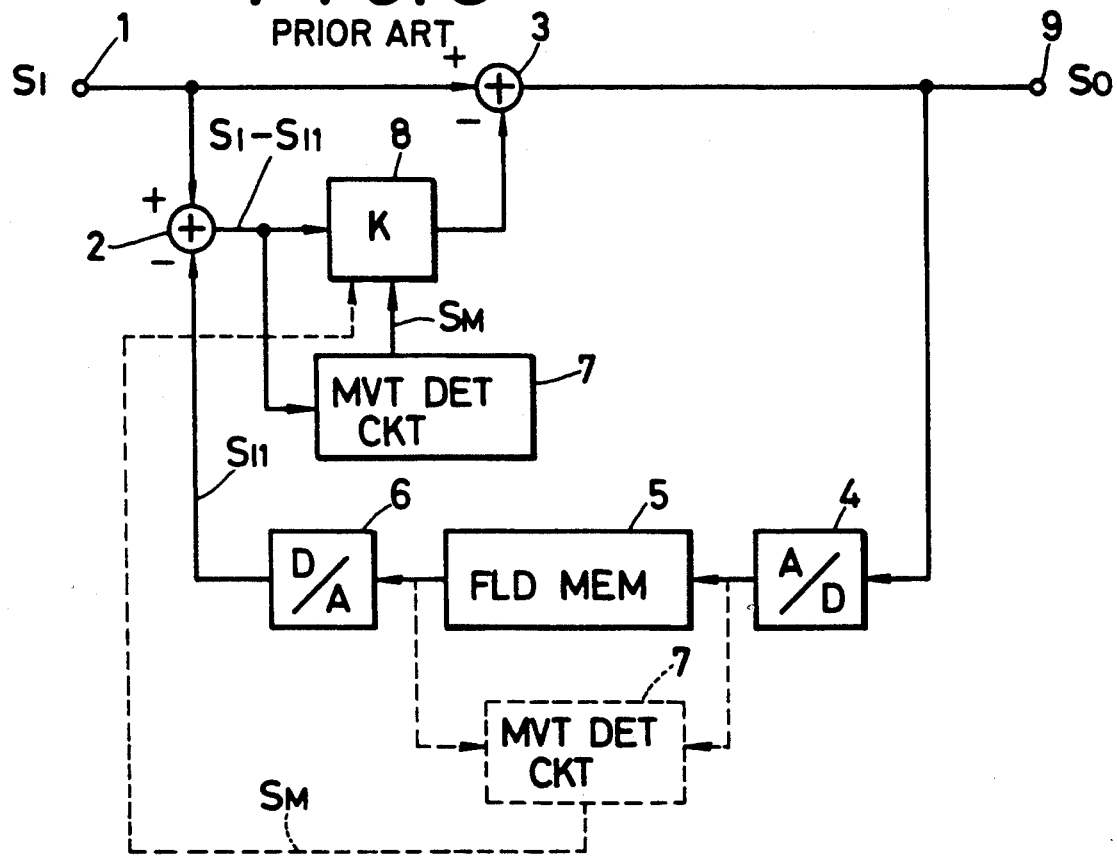

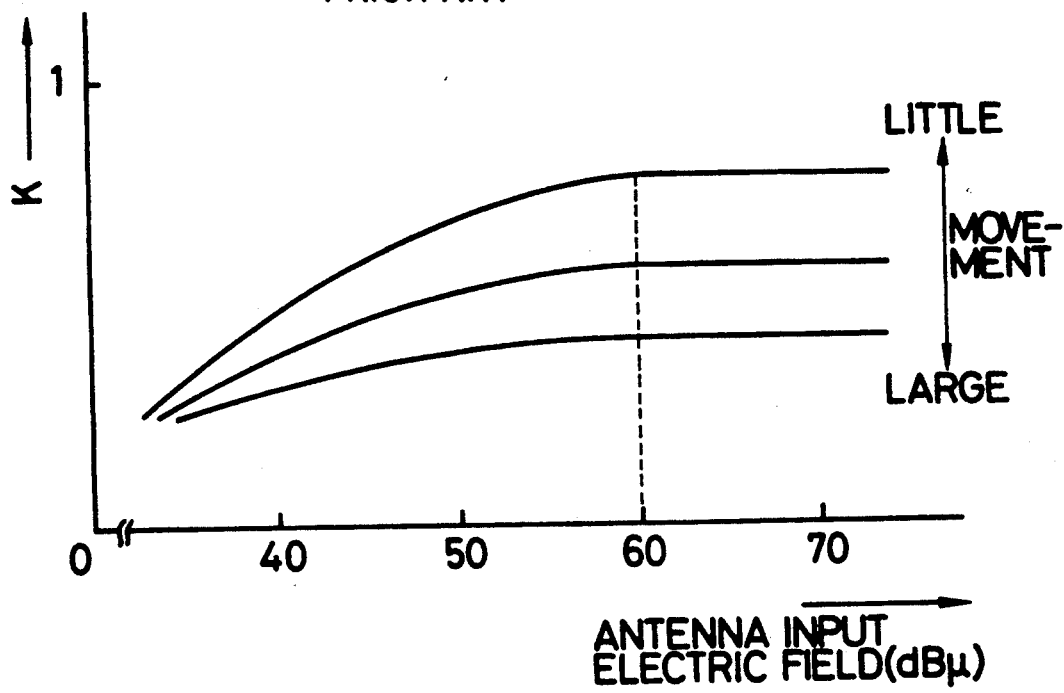

APPARATUS AND METHOD FOR REDUCING NOISE IN A VIDEO SIGNAL

This is a continuation of co-pending application Ser. No. 07/294,662, filed as PCT/JP88/00287, Mar. 18, 1988, now abandoned.

TECHNICAL FIELD

This invention relates to a noise reduction circuit for video signals used in, for instance, a television receiver.

BACKGROUND ART

As a noise reduction circuit used in a television receiver or the like, those shown in FIGS. 7 and 8 are hitherto known in which a delay circuit such as a field memory (or a frame memory) is used.

FIG. 7 shows one forming an open-loop, in which input video signal $S_I$ containing noise and fed at input terminal 1 is supplied to adders 2 and 3, and is also supplied to A/D converter 4 for converting it into a digital signal. It is and then written into field memory 5, which functions as a delay circuit. The digital signal read from memory 5 is converted back into an analog signal $S_{f1}$ by D/A converter 6. Accordingly, this analog signal $S_{f1}$ is delayed by a field in relation to the above signal $S_I$.

This signal $S_{f1}$ is supplied to adder 2 and subtracted from the above signal $S_I$. The difference signal $S_I-S_{f1}$ between signal $S_I$ and signal $S_{f1}$ is obtained from adder 2 and is supplied to movement detection circuit 7 and to gain controlled amplifier 8. The above difference signal $S_I-S_{f1}$ is considered a noise component if there is no movement in input signal $S_I$ within a field. In this case, difference signal $S_I-S_{f1}$ is multiplied by coefficient k at gain controlled amplifier 8 in accordance with detection signal $S_M$ from detection circuit 7 and then subtracted from signal $S_I$ at adder 3. Therefore, output signal $S_o$ in which noise is reduced is obtained from adder 3 at output terminal 9.

When a movement is detected by movement detection circuit 7, the above difference signal $S_I-S_{f1}$ is considered to contain a movement component so gain controlled amplifier 8 reduces the value of K in accordance with signal $S_M$ from detection circuit 7 to reduce the quantity of the movement component subtracted at adder 3.

Movement detection circuit 7 detects the level of the above difference signal $S_I-S_{f1}$, and produces, detection signal $S_M$ with which coefficient K of gain controlled amplifier 8 is controlled. This movement detection circuit 7 may also be placed to compare the input signal and output signal of field memory 5 with each other as shown by dotted lines in the drawing.

FIG. 8 shows an instance forming a closed loop, in which signal $S_{f1}$, that a part which is output signal $S_o$ delayed by a field in memory 5, is subtracted from signal $S_I$ at adder 2 and that difference signal $S_I-S_{f1}$ is passed through gain controlled 8 amplified and subtracted from signal $S_I$ at adder 3. Thus, noise contained by signal $S_o$ is gradually removed by feeding back signal $S_o$, after delaying it by a field, so that $S_o$ is obtained from adder 3 with noise reduced.

A noise reduction circuit using a frame memory as disclosed by Patent Kokai Sho 54-157429 is known.

DISCLOSURE OF THE INVENTION

In the noise reduction circuit using a delay circuit such as a field memory (or a frame memory) as described above, the level of signal $S_I-S_{f1}$ supplied to movement detection circuit 7 becomes high when the antenna input electric field of the receiver is middle to weak, that is, input signal $S_I$ contains considerable noise components. As a result, even if there is no movement in the image, K is set to a value smaller than is necessary to fully remove noise from output signal $S_o$.

FIG. 9 shows the noise reduction characteristics of the circuits of FIGS. 7 and 8, in which the value of K varys in accordance with the quantity of the movement. This shows that when the antenna input electric field becomes less than a predetermined level (about 60 dBμ) and noise increases, it is judged that there is a movement. As a result, the value of K becomes small so the noise reduction effect becomes small.

To overcome such a problem, in a noise reduction circuit according to the invention, a difference signal between the original video signal and a signal obtained by passing the original video signal through a delay circuit is detected, a signal obtained by passing the above difference signal through a gain controlled amplifier is substracted from the above original video signal, and the gain of the above gain control amplifier is controlled as a function of both a detection signal of the movement in the original video signal and a detection signal of the input electric field.

According to the noise reduction circuit of the invention, since the coefficient K of a gain controlled amplifier is controlled in accordance with both a movement detection signal and the input electric field strength, the coefficient K is prevented from being erroneously decreased when noise is great but there is a middle to weak input elctric field.

Accordingly, the noise reduction circuit of the invention, prevents a situation where the input electric field becomes middle to weak and noise increases, but the movement detection circuit erroneously judges there is a movement and decreases the gain of the gain controlled amplifier.

BRIEF DESCRIPTION OF DRAWINGS

FIGS. 7 and 8 are block diagrams of conventional noise reduction characteristics.

FIG. 9 is graph showing conventionall noise reduction characteristics.

THE BEST MODE FOR CARRYING OUT THE INVENTION

Figure 1:
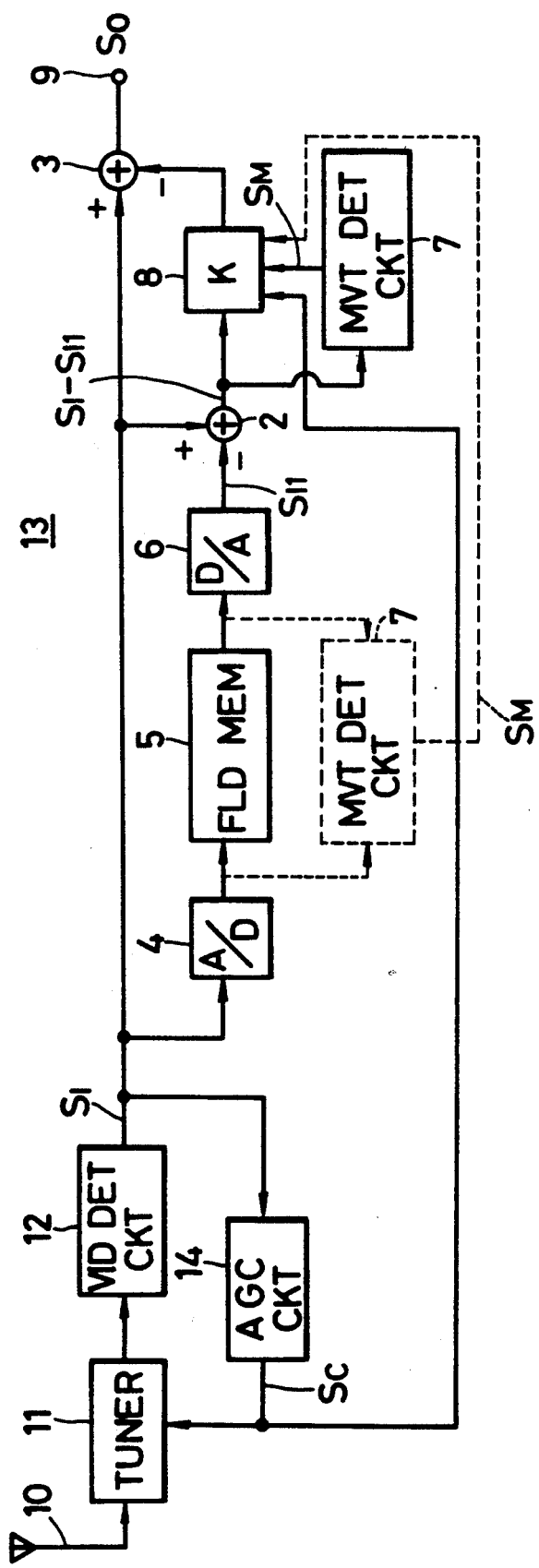
FIG. 1 is a block diagram showing a first embodiment of the invention.
Figure 7:
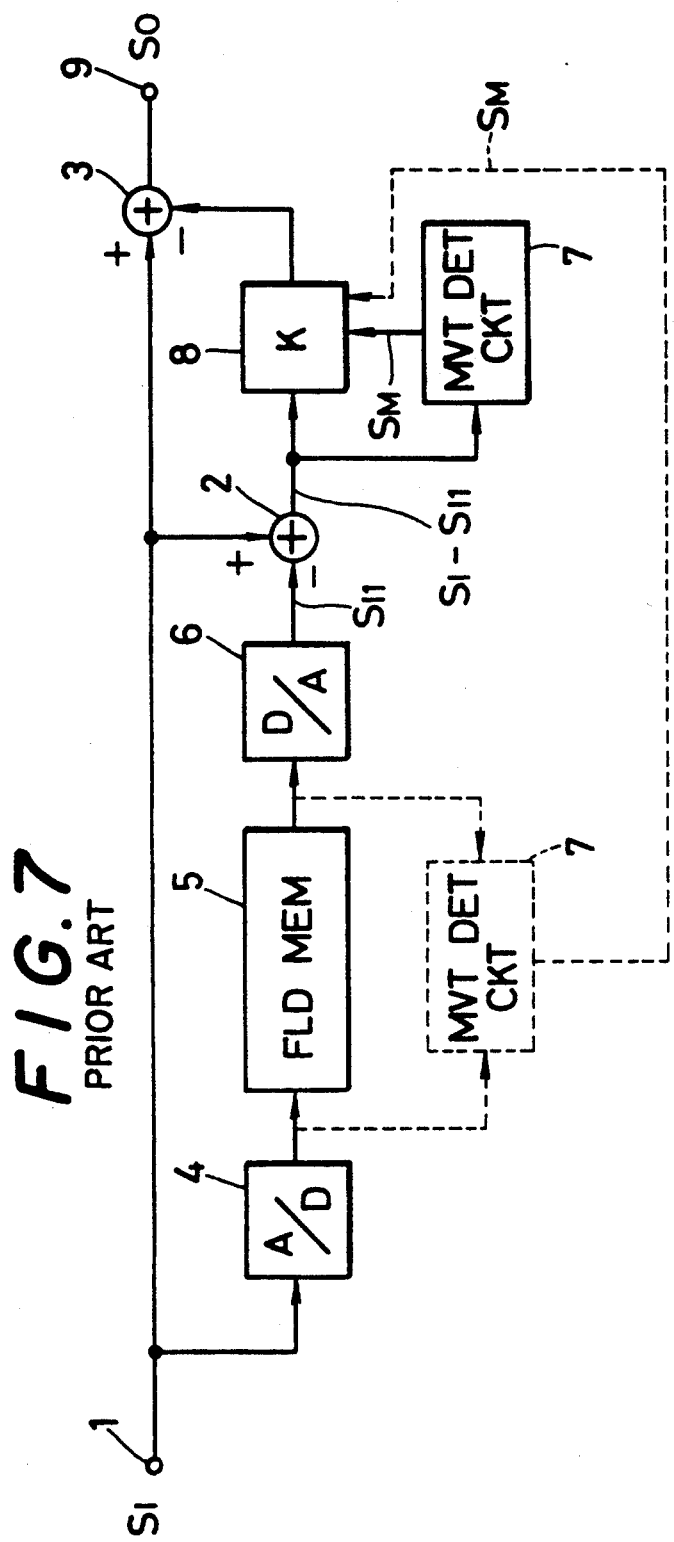

FIG. 1 shows a first embodiment of the invention, in which parts corresponding to those of FIG. 7 are denoted by the same references as those of FIG. 7 to omit the descriptions.

In FIG. 1, a signal receivedf by antenna 10 is converted into a video intermediate frequency signal after being tuned at a tuner 11, and then supplied to a video detection circuit 12. Video signal $S_I$ obtained from video detection circuit 12 is supplied to a noise reduction circuit 13. Noise reduction circuit 13 is constructed the same as that of FIG. 7.

The above video signal $S_I$ is also supplied to an automatic gain control (AGC) circuit 14 which generates gain control signal $S_C$. Therefore, signal $S_C$ reflects the input electric field strength of antenna 10. Signal $S_C$ controls the gain of tuner 11 and is also supplied to a gain controlled amplifier 8 to control the value of the coefficient K in cooperation with movement detection signal $S_M$.

Figure 2:
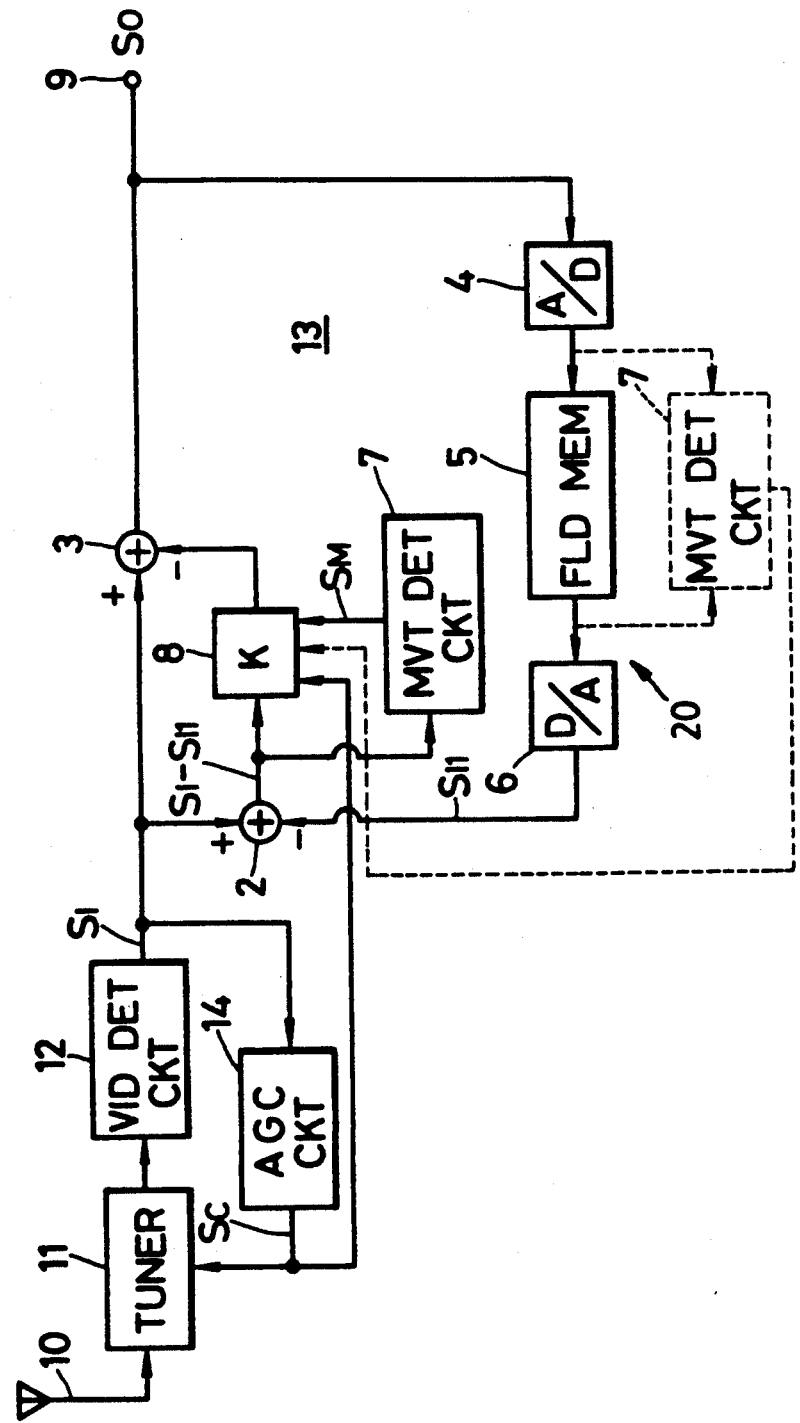
FIG. 2 is a block diagram showing a second embodiment of the invention.

FIG. 2 shows a second embodiment of the invention, in which parts corresponding to those of FIG. 8 are denoted by the same references as those of FIG. 8 to omit the descriptions.

Again, as described above, in this embodiment gain control signal $S_C$ obtained from AGC circuit 14 is supplied to tuner 11, and also, to gain controlled amplifier 8 together with movement detection signal $S_M$.

Noise reduction circuit 13 is constructed the same as that of FIG. 8. Namely, it is a feed-back circuit in which field memory 5 is arranged in a feed-back loop 20 and said difference signal $S_I - S_{I1}$ is obtained by subtracting the output signal of the feed-back loop from signal $S_I$.

Figure 3:
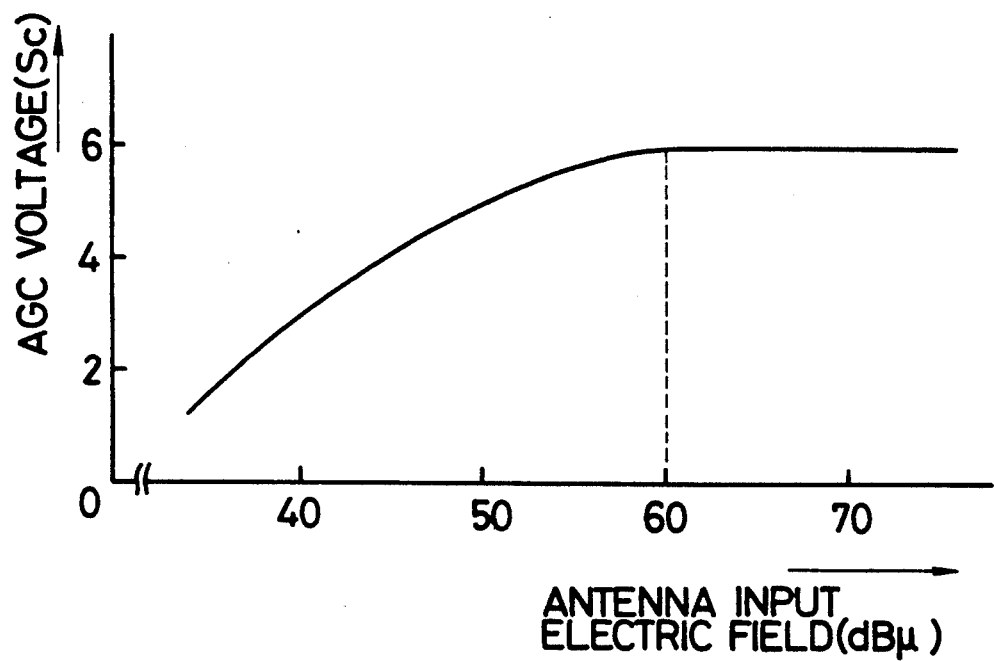
FIG. 3 is a graph showing the relationship between AGC voltage and input electric field.

FIG. 3 shows a relationship between the above gain control signal $S_C$ (AGC voltage) and the antenna input electric field strength, in which signal $S_C$ decreases when the input electric field strength is less than about 60 dBμ, thereby, increasing the gain of tuner 11 and preventing a decrease in the coefficient K unnecessarily.

Figure 4:
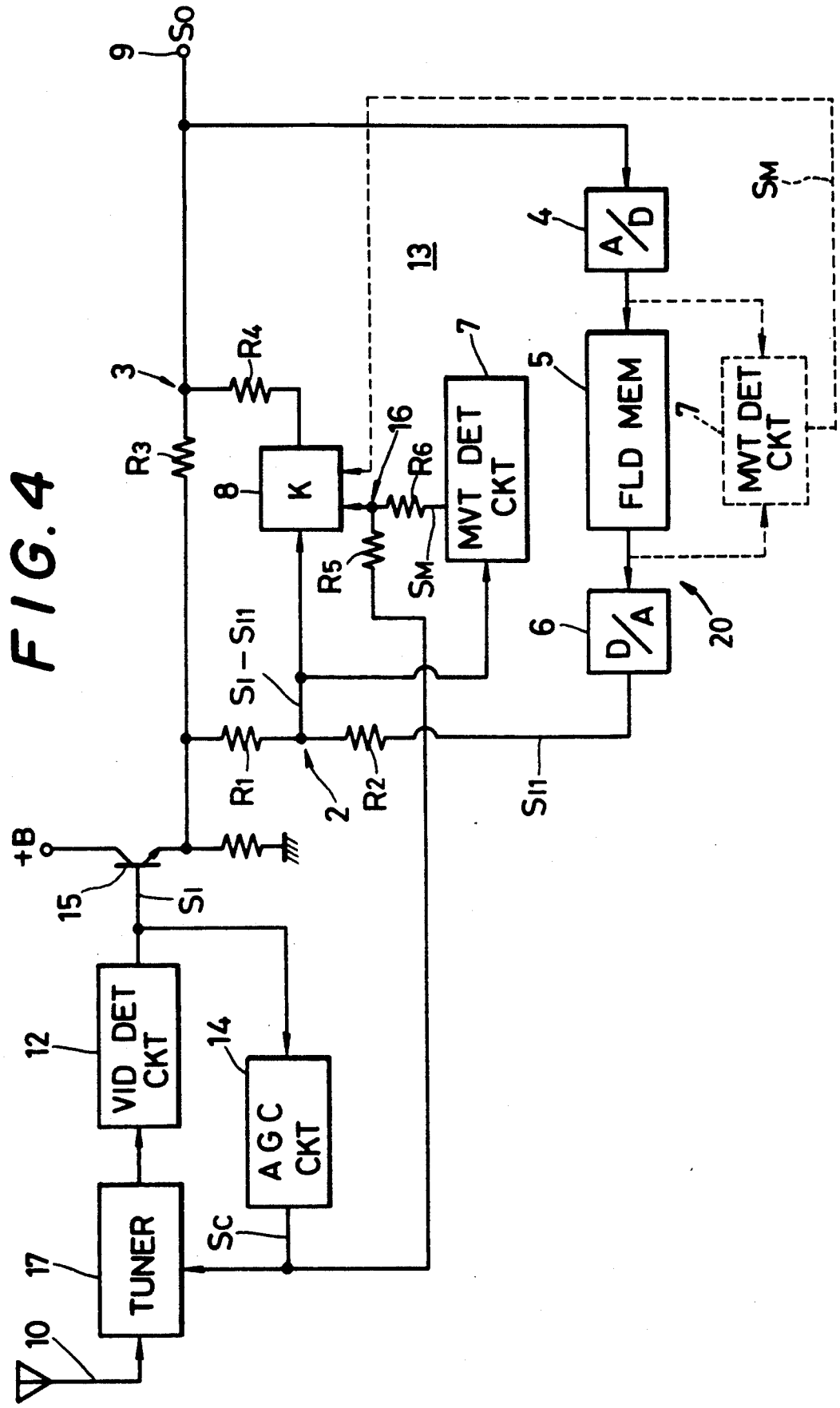
FIG. 4 is a block diagram showing a third embodiment of the invention.

FIG. 4 shows a third embodiment in which signals $S_C$ and $S_M$ are added to each other in the embodiment of FIG. 2.

In FIG. 4, signal $S_I$ obtained from video detection circuit 12 is supplied to noise reduction circuit 13 through a transistor 15. Adder 2 in noise redection circuit 13 comprises resistances $R_1$ and $R_2$, and adder 3 comprises resistances $R_3$ and $R_4$. The above two signals $S_C$ and $S_M$ are added to each other at an adder 16 comprising resistances $R_5$ and $R_6$ and the added output signal is supplied to gain controlled amplifier 8.

Figure 5:
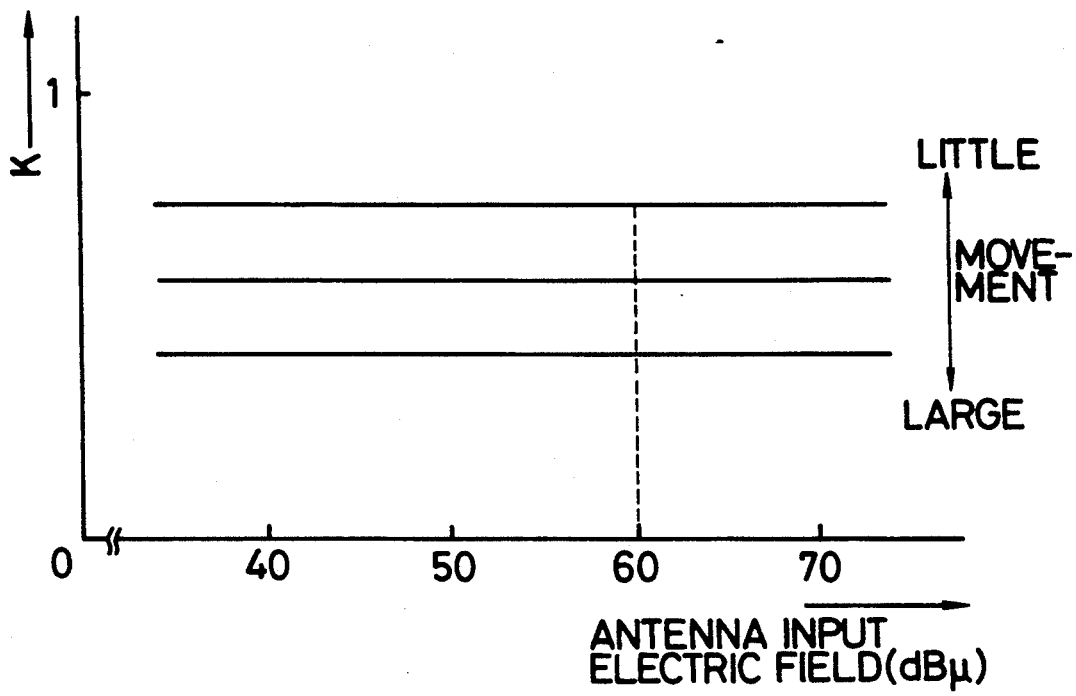
FIGS. 5 and 6 are graphs showing the noise reduction characteristics according to the invention.

FIG. 5 shows noise reduction characteristics of the circuit of FIG. 4 in which signals $S_C$ and $S_M$ are added to each other. It shows that K does not vary in accordance with the input electric field strength through K varys in accordance with movement detection signal $S_M$.

Figure 6:
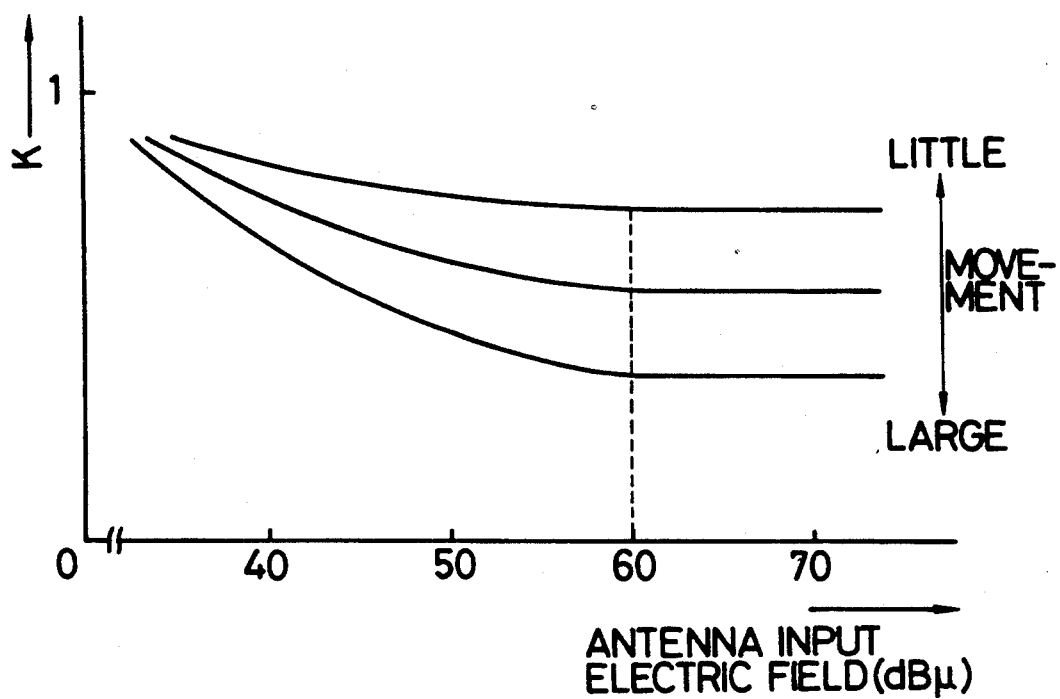

FIG. 6 shows noise reduction characteristics in the case where the noise reduction function is preferential at a middle to weak electric field by multiplying signals $S_C$ and $S_M$ with each other. When noise increases, it becomes difficult to discriminate a noise component from a movement component in the above difference signal $S_I - S_{I1}$. In that case, it is better to increase the noise reduction effect by increasing K as shown in FIG. 6.

Although signal $S_C$ obtained from AGC circuit 14 is used as a signal reflecting the input electric field strength in the above first to third embodiments, other signals may be used, for instance, a signal that indicates noise is, contained by a synchronizing signal obtained from a synchronizing signal separation circuit may be used.

CAPABLE OF EXPLOITATION IN INDUSTRY

According to the present invention, an unnecessary decrease in the gain of the gain controlled amplifier can be effectively avoided in by the movement detection circuit erroneously judging there is a movement when the input electric field strength becomes middle to weak and noise increases. Therefore, the present invention is capable of application to a television receiver, etc.

We claim:

1. A noise reduction circuit for a video signal comprising:
    a tuner and video detector for receiving and selecting an input television video signal;
    movement detection means connected to the video detector for detecting movement in the input video signal and generating a first control signal depending upon such movement;
    an automatic gain control circuit which receives the input video signal and controls the gain of the tuner and outputs a second control signal depending upon the strength of the input video signal;
    difference detecting means including a field or frame delay circuit, connected to the video detector for detecting the difference between the input video signal and a delayed input video signal from the field or frame delay circuit, and generating a field or frame difference signal;
    a gain controlled amplifier, the gain of which is responsive to both the first and second control signals, connected to the difference detecting means for receiving the difference signal and controlling its amplitude, and outputting an amplified signal; and
    a signal composing circuit for subtracting the amplified signal from the input video signal.

2. A noise reduction circuit for a video signal as defined in claim 1, wherein the gain of the gain controlled amplifier is controlled to decrease when either the second gain control signal becomes larger, indicating an increase in movement, or the first gain control signal becomes smaller, indicating a decrease in the electric field strength of the received television signal.

3. A noise reduction circuit for a video signal comprising:
    a gain controllable tuner for receiving a television broadcast signal;
    a video detector connected to the tuner for generating an input video signal;
    a gain control circuit connected between the video detector for producing a first gain control signal and supplying the first gain control signal to the tuner for controlling the gain of the tuner as a function of the amplitude of the input video signal;
    difference detecting means, including a delay circuit for delaying the input video signal by a predetermined period, connected to the video detector for generating a difference signal corresponding to the difference between the input video signal and the input signal as delayed by the delay circuit;
    a gain controlled amplifier having an input terminal, which is connected to the difference detecting means and supplied with the difference signal, and an output terminal at which is produced a gain controlled video difference signal;
    a subtraction means connected between the video detector and the output of the gain controlled amplifier for substracting the gain controlled video difference signal from the video input signal to produce a video output signal;
    movement detection means connected to the difference detecting means to receive the difference signal, detect movement of the input video signal, and generate a second gain control signal which is supplied to the gain controlled amplifier to control, in part, the gain of the gain controlled amplifier as a function of the movement of the input video signal; and means for supplying the first gain control signal to the gain controlled amplifier to control, in part, the gain of the gain controlled amplifier as a function of the amplitude of the input video signal.

4. A noise reduction circuit according to claim 3, wherein the delay circuit for delaying the input video signal comprises a field or frame delay circuit.

5. A noise reduction circuit according to claim 4 wherein an A/D converter is provided at the input side of the field or frame delay circuit and a D/A converter is provided at the output side thereof.

6. A noise reduction circuit according to claim 4 wherein an A/D converter is provided at the input side of the field or frame delay circuit and a D/A converter is provided at the output side thereof.

7. A noise reduction circuit according to claim 6 wherein the difference detecting means includes a feedback loop for detecting the field or frame difference signal.

8. A noise reduction circuit according to claim 6 wherein the gain controlled amplifier responds to the first and second control signals by reducing gain when either the movement of the input video signal increases or the strength of the input video signal decreases.

9. A noise reduction circuit according to claim 3 wherein the difference detecting means includes a feedback loop for detecting a field or frame difference signal.

10. A noise reduction circuit according to claim 9 wherein the movement detection means detects movement by measuring differences in the input video signal between different fields or frames.

11. A noise reduction circuit according to claim 10 wherein the gain controlled amplifier responds to the first and second control signals by reducing gain when either the movement of the input video signal increases or the strength of the input video signal decreases.

12. A noise reduction circuit according to claim 9 wherein the gain controlled amplifier responds to the first and second control signals by reducing gain when either the movement of the input video signal increases or the strength of the input video signal decreases.

13. A noise reduction circuit according to claim 3 wherein the movement detection means detects movement by measuring differences in the input video signal between different field or frames.

14. A noise reduction circuit according to claim 3 wherein the gain controlled amplifier responds to the first and second control signals by reducing gain when either the movement of the input video signal increases or the strength of the input video signal decreases.

15. A noise reduction circuit for a video signal comprising:

a gain controllable tuner for receiving a television broadcast signal;

a video detector connected to the tuner for generating an input video signal;

a gain control circuit connected between the video detector for producing a first gain control signal and supplying the first gain control signal to the tuner for controlling the gain of the tuner as a function of the amplitude of the input video signal;

a gain controlled amplifier having an input terminal and an output terminal at which is produced a gain controlled video difference signal;

first subtraction means connected between the video detector and the output of the gain controlled amplifier for subtracting the gain controlled video difference signal from the video input signal to produce a video output signal;

difference detecting means connected to the first substraction means and supplied with the video output signal, and including a delay circuit for delaying the output video signal by a predetermined period, for generating a difference signal corresponding to the difference between the output video signal and the output signal as delayed by the delay circuit;

second subtraction means connected to the video detector and the difference detecting means for subtracting the difference signal from the input video signal to produce a resultant signal which is supplied to the input of the gain controlled amplifier;

movement detection means connected to the input of the gain controlled amplifier to receive the resultant signal, detect movement of the input video signal, and generate a second gain control signal which is supplied to the gain controlled amplifier to control, in part, the gain of the gain controlled amplifier as a function of the movement of the input video signal; and means for supplying the first gain control signal to the gain controlled amplifier to control, in part, the gain of the gain controlled amplifier as a function of the amplitude of the input video signal.

16. A noise reduction circuit for a video signal as defined in claim 15, wherein the gain of the gain controlled amplifier is controlled to decrease when either the second gain control signal becomes larger, indicating an increase in movement, or the first gain control signal becomes smaller, indicating a decrease in the electric field strength of the received television signal.

* * * * *